United States Patent
Titze et al.

(10) Patent No.: US 10,677,597 B2
(45) Date of Patent: Jun. 9, 2020

(54) METHOD AND SYSTEM FOR CREATING A DIGITAL MAP

(71) Applicant: VOLKSWAGEN AKTIENGESELLSCHAFT, Wolfsburg (DE)

(72) Inventors: Andreas Titze, Braunschweig (DE); Stefan Ortmann, Braunschweig (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 0 days.

(21) Appl. No.: 15/773,660

(22) PCT Filed: Nov. 9, 2016

(86) PCT No.: PCT/EP2016/077125
§ 371 (c)(1),
(2) Date: May 4, 2018

(87) PCT Pub. No.: WO2017/089137
PCT Pub. Date: Jun. 1, 2017

(65) Prior Publication Data
US 2018/0321046 A1    Nov. 8, 2018

(30) Foreign Application Priority Data

Apr. 1, 2016 (DE) .................. 10 2016 205 436

(51) Int. Cl.
*G01C 21/32* (2006.01)
*G06K 9/00* (2006.01)
*G09B 29/00* (2006.01)

(52) U.S. Cl.
CPC ......... *G01C 21/32* (2013.01); *G06K 9/00798* (2013.01); *G06K 9/00805* (2013.01); *G09B 29/003* (2013.01)

(58) Field of Classification Search
CPC .. G01C 21/32; G09B 29/003; G06K 9/00805; G06K 9/00798
(Continued)

(56) References Cited

U.S. PATENT DOCUMENTS

2002/0085095 A1* 7/2002 Janssen .................. G01C 15/00
348/148
2008/0262721 A1   10/2008 Guo et al.
(Continued)

FOREIGN PATENT DOCUMENTS

DE   102011119762 A1   6/2012
DE   102012208974 A1   12/2012
(Continued)

OTHER PUBLICATIONS

Search Report for International Patent Application No. PCT/EP2016/077125; dated Feb. 6, 2017.

*Primary Examiner* — Brian P Sweeney
(74) *Attorney, Agent, or Firm* — Barnes & Thornburg LLP (57) ABSTRACT

A method for creating a digital map in at least one mobile device including capturing an image sequence of an environment; detecting and classifying objects in the captured image sequence; determining object positions of the objects relative to the mobile device; establishing a section in the environment wherein the section has a predetermined size and predetermined boundaries; assigning the detected and classified objects to the determined object positions in the established section; determining a traffic lane provided in the section; transmitting object information and the object positions of the detected and classified objects, section information relating to the established section, traffic lane information and time information to the map creation device. In the map creation device, the data is received, compared, and (Continued)

sections are joined and merged to form a digital map. Also disclosed is an associated system.

20 Claims, 3 Drawing Sheets

(58) Field of Classification Search
USPC .......................................................... 701/540
See application file for complete search history.

(56) References Cited

U.S. PATENT DOCUMENTS

2012/0166074 A1* 6/2012 Weng ..................... G01C 21/32
701/409
2012/0310516 A1* 12/2012 Zeng ...................... G01C 21/32
701/300

FOREIGN PATENT DOCUMENTS

| DE | 102013208521 A1 | 11/2014 |
|----|----|----|
| DE | 102014002821 A1 | 8/2015 |
| EP | 1962057 A1 | 8/2008 |
| JP | 5206687 B2 | 3/2011 |
| KR | 20110059209 A | 6/2011 |
| WO | 2009097918 A2 | 8/2009 |

* cited by examiner

METHOD AND SYSTEM FOR CREATING A DIGITAL MAP

PRIORITY CLAIM

This patent application is a U.S. National Phase of International Patent Application No. PCT/EP2016/077125, filed 9 Nov. 2016, which claims priority to German Patent Application Nos. 10 2015 015 158.4, filed 25 Nov. 2015, and 10 2016 205 436.8, filed 1 Apr. 2016, the disclosures of which are incorporated herein by reference in their entireties.

SUMMARY

Illustrative embodiments relate to a method and a system for creating a digital map, in particular, for a motorized transportation vehicle.

BRIEF DESCRIPTION OF THE DRAWINGS

The disclosed embodiments are explained in more detail below with reference to the figures, in which.

DETAILED DESCRIPTION

Modern motorized transportation vehicles have a multiplicity of assistance systems, including navigation systems which are able to locate a motorized transportation vehicle within an environment. Such a navigation system is based, for example, on a global positioning system (GPS) in which a position of the motorized transportation vehicle is determined by evaluating a plurality of satellite-based signals. Furthermore, systems in which maps are created from the environment of the motorized transportation vehicle are also known. In the case of a subsequent journey through a region which has already been mapped, the motorized transportation vehicle can then be located in the created map.

DE 10 2014 002 821 A1 discloses a method for locating a mobile device in a surrounding area, the device having a plurality of sensors for capturing the surrounding area of the device using different locating methods, a reference map which comprises a plurality of positions within the surrounding area being available for the surrounding area, at least one locating method which can be carried out using at least one sensor for capturing the surrounding area being recommended for at least one position within the surrounding area, the at least one locating method which can be carried out using at least one sensor and is recommended according to the reference map being used to locate the device for a current position of the mobile device.

DE 10 2011 119 762 A1 discloses a positioning system suitable for a motorized transportation vehicle and a corresponding method. The system comprises a digital map in which data relating to location-specific features are recorded in a localized manner, at least one environment detection apparatus for capturing the location-specific features in the surrounding area of the transportation vehicle, and a locating module coupled to the digital map and the environment detection apparatus. The locating module has a processing unit for comparing the captured data and the data recorded in the digital map using the location-specific features and for locating the transportation vehicle position on the basis of the location-specific features recorded in a localized manner in the digital map. The system also comprises an inertial measuring unit of the transportation vehicle for transportation vehicle movement data, which measuring unit is coupled to the locating module, the processing unit of which is configured to determine the transportation vehicle position by the transportation vehicle movement data on the basis of the position located on the basis of the location-specific features.

The disclosed embodiments provide a method and a system for creating a digital map in which the locating process is improved without determining a position beforehand using a GPS.

A method for creating a digital map is provided, comprising the following operations in at least one mobile device: capturing an image sequence of an environment of the mobile device by at least one camera, identifying and classifying objects in the captured image sequence by an evaluation unit, determining object positions of the objects relative to the mobile device by the evaluation unit, defining a section in the environment, the section having a predetermined size and predetermined boundaries, assigning the identified and classified objects to the determined object positions in the defined section, determining a lane present in the section by the evaluation unit, transmitting object information and the object positions of the identified and classified objects, section information relating to the defined section, lane information and an item of time information to a map creation device by a transmitting device, repeating the preceding operations to define further sections of the environment; also comprising the following operations in the map creation device: receiving the object information and the object positions, the section information, the lane information and the time information for each of the sections from the at least one mobile device, comparing the individual sections with one another on the basis of the object information and object positions, the section information, the lane information and the time information, joining the sections of the at least one mobile device at their respectively adjacent boundaries, merging the joined sections of the at least one mobile device to form a digital map A system for creating a digital map is also created, comprising at least one mobile device having: at least one camera for capturing an image sequence of an environment of the at least one mobile device, an evaluation unit, and a transmitting device for communicating with a map creation device, the evaluation unit being designed to identify and classify objects in the captured image sequence, to determine object positions of the objects relative to the mobile device, to define a section in the environment, the section having a predetermined size and predetermined boundaries, to assign identified and classified objects to the determined object positions in the defined section, to determine a lane of the motorized transportation vehicle present in the section, to transmit object information and the object positions of the identified and classified objects, section information relating to the defined section, lane information and an item of time information to the map creation device by the transmitting device, and to repeat the preceding operations to define further sections of the environment; and the map creation device which is designed to receive the object information and the object positions, the section information, the lane information and the time information for each of the sections from the at least one mobile device, to compare the individual sections with one another on the basis of the object information and object positions, the section information, the lane information and the time information, to join the sections of the at least one mobile device at their respectively adjacent boundaries, and to merge the joined sections of the at least one mobile device to form a digital map.

Provision is made for the mobile device to be a motorized transportation vehicle and for the map creation device to be a central server with which the motorized transportation vehicle communicates via a wireless communication connection. Further mobile devices are then further motorized transportation vehicles, for example, which likewise communicate with the central server. However, provision may also be made for the map creation device to be integrated in the mobile device.

At least one disclosed embodiment provides for the lane determined in a section to be described by a corridor comprising a left-hand lane boundary and a right-hand lane boundary, the left-hand lane boundary and the right-hand lane boundary each being described as lane functions. In this way, a volume of data needed to describe the lane can be reduced. This saves bandwidth during communication between the at least one mobile device and the map creation device via a communication connection.

At least one disclosed embodiment provides, in particular, for the lane functions to be a third-degree polynomial functions. This results in great data reduction with simultaneous flexibility. Only four coefficients must then be transmitted for each coordinate, with the result that a total of twelve coefficients for each section must be transmitted in the case of three dimensions. In this case, provision may be made, in particular, for the polynomial functions to have a time as an independent variable. However, it is likewise possible to use a location coordinate, for example, a road etc., as an independent variable.

Another disclosed embodiment provides for the sections of the at least one mobile device to be joined at their respectively adjacent boundaries by a similarity comparison, in which case a predetermined value for a similarity must be exceeded so that sections are identified as adjacent. This can be carried out for a region around the boundaries, for example. A similarity analysis, for example, using common object and pattern recognition methods, is then carried out in this region. The regions which exhibit a great similarity in the patterns and objects are identified as adjacent and are then joined, with the result that the digital map can be gradually constructed from the sections in this manner.

At least one disclosed embodiment provides for the joined sections of the at least one mobile device to be merged taking into account a weighting, the weighting being defined by the time information and/or at least one further criterion. This ensures that an image of the environment which is as up-to-date as possible is always stored in the digital map, for example. This can be relevant, in particular, when obstacles in the lanes, for example, objects or roadworks, are identified for the first time or are no longer identified after they disappear for the first time. Other objects in the environment may likewise change. The weighting for transmitted data may be higher, for example, the closer transmitted object information and object positions, section information and lane information is/are to a current time. However, other weighting criteria may also be provided as a further criterion, for example, a predefined weighting for particular types of mobile devices or particular sections etc.

Another disclosed embodiment provides, in particular, for the process of merging the joined sections of the at least one mobile device to comprise averaging a plurality of object positions determined for an object. In this way, a better estimated value is assigned to the object position determined for the object since a measurement error is reduced with the number of measurements.

Another disclosed embodiment provides for the process of joining the sections of the at least one mobile device at their respectively adjacent boundaries, at least at these boundaries or in regions around the boundaries, to comprise a comparison of the lanes or the lane functions of the sections. The joining process can then be carried out in an efficient and time-saving manner since only the end regions of the lanes or lane functions have to be compared with one another, thus reducing the necessary computing complexity.

At least one disclosed embodiment provides for the evaluation unit to additionally capture additional information for a section, which additional information is transmitted to the map creation device by the transmitting device, and/or for this additional information or further additional information to be stored by the map creation device for this section in the digital map. Such an item of additional information may comprise, for example, an item of additional information relating to a condition of the lanes. The digital map may thus store whether the lane is wet or slippery on account of the weather conditions, for example, or whether the general condition is good or poor. The additional information is then stored in the digital map and can be made available to further mobile devices. In this case, it is possible both for the additional information to be provided by the at least one mobile device and for the additional information to be provided in another manner, for example, by central traffic management or information systems.

Parts of the mobile device, of the map creation device and also of the system may, individually or in combination, be a combination of hardware and software, for example, a program code which is executed on a microcontroller or microprocessor.

Figure 1:
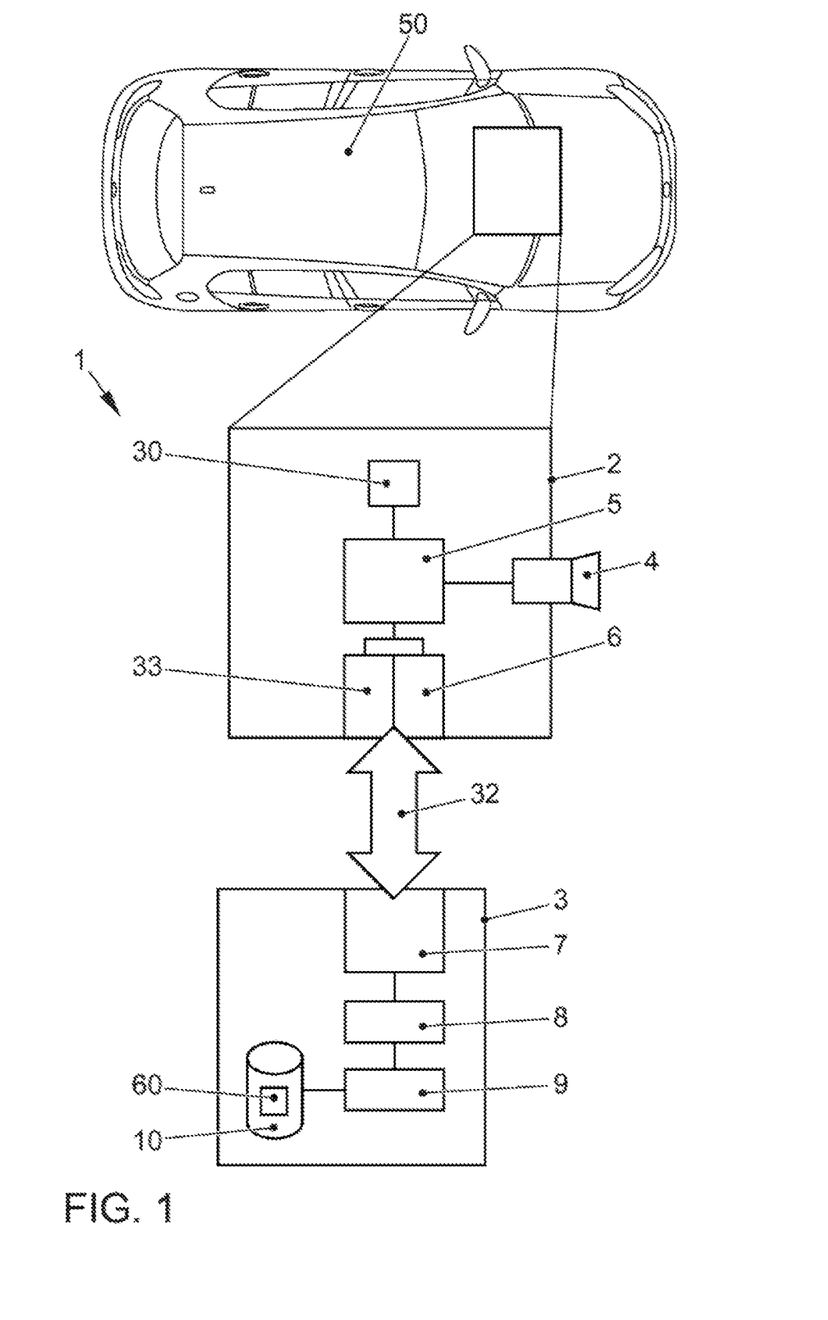
FIG. 1 shows a schematic illustration of an embodiment of the system for creating a digital map.

FIG. 1 illustrates a schematic illustration of a system 1 for creating a digital map 60. The system 1 comprises at least one mobile device 2 which is formed in a motorized transportation vehicle 50 in this example, and a map creation device 3 which may be a central server, for example. The mobile device 2 comprises a camera 4, an evaluation unit 5, a transmitting device 6, a height sensor 30 and a receiving device 33. The map creation device 3 comprises, for example, a receiving device 7, a joining device 8, a merging device 9 and a memory 10 which stores the digital map 60.

Figure 2:
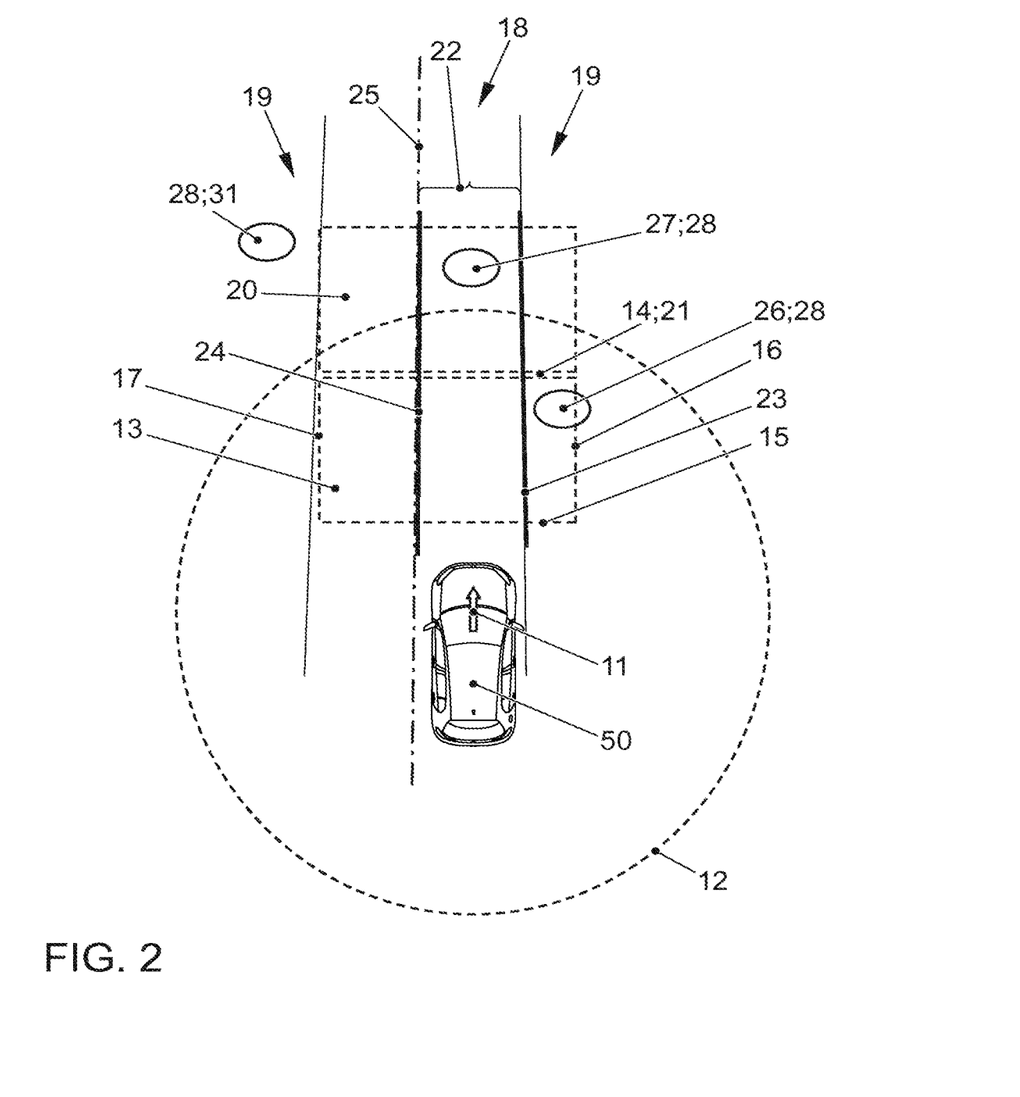
FIG. 2 shows a schematic illustration of a typical environment of a motorized transportation vehicle for illustrating the method.

FIG. 2 shows a schematic illustration of a typical environment 12 of a motorized transportation vehicle 50 for illustrating the method. The camera 4 (see FIG. 1) points in a direction of travel 11 of the motorized transportation vehicle 50, for example. The camera 4 captures a sequence of images of the environment 12 of the motorized transportation vehicle 50. The captured sequence of images is passed from the camera 4 to the evaluation unit 5. The evaluation unit 5 defines a section 13 from the sequence of images. This section 13 has a predefined size. Such a section 13 also has a front boundary 14, a rear boundary 15, a right-hand boundary 16 and a left-hand boundary 17. The defined section 13 contains a portion of a road 18 on which the motorized transportation vehicle 50 is currently situated and a part of the surrounding area 19 of the road 18. A further section 20 is defined at a later time from a further sequence of images, with the result that the rear boundary 21 of the further section 20 is the same as the front boundary 14 of the section 13 defined before it. In this manner, the environment 12 of the motorized transportation vehicle 50 is gradually captured at different times and is gradually concatenated as sections 13, 20.

In each section 13, 20, the evaluation unit 5 determines a lane 22 of the motorized transportation vehicle 50. In this example, the lane 22 is bounded on the right-hand side by the roadway boundary 23 of the road 18, in which case the right-hand roadway boundary 23 can be given by the right-hand roadway line, for example. The left-hand lane boundary 24 of the lane 22 is given by a center line 25 of the road 18, for example.

The respective lane boundary 23, 24 of the lane 22 is recognized by an image recognition method in the evaluation unit 5 and is mathematically represented as a third-degree polynomial for each coordinate, for example:

$$X(t) = a_3 t^3 + a_2 t^2 + a_1 t + a_0,$$

$$Y(t) = b_3 t^3 + b_2 t^2 + b_1 t + b_0,$$

$$Z(t) = c_3 t^3 + c_2 t^2 + c_1 t + c_0.$$

Figure 3:
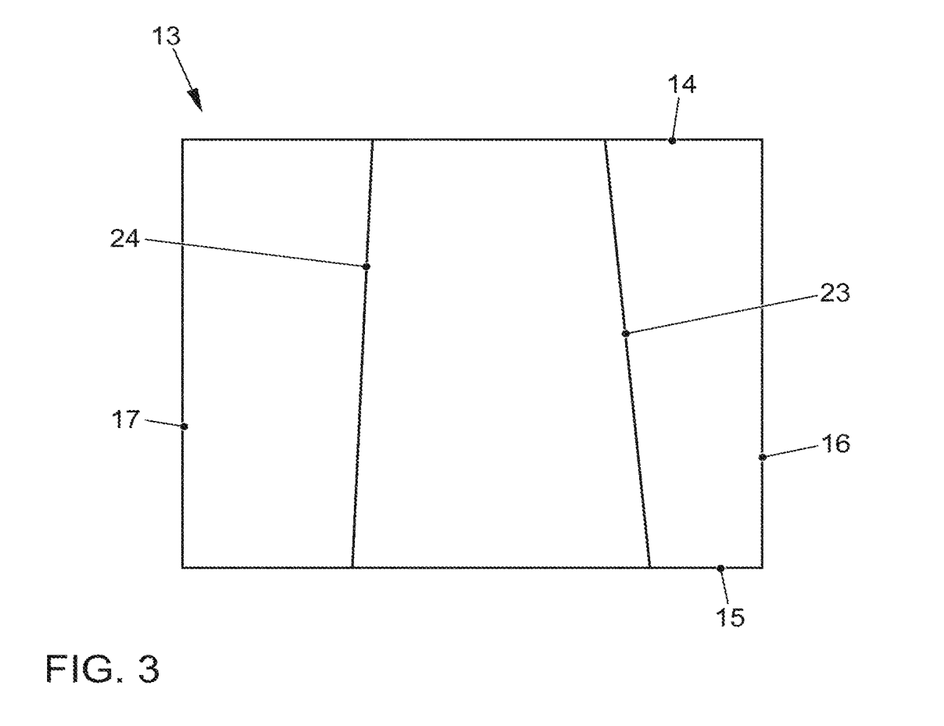
FIG. 3 shows a schematic illustration of a defined section having lane functions.

The coordinates X, Y and Z relate to a coordinate system which is based, for example, on the camera position or the center point of the front boundary 14 of the section 22. The coordinate X describes the coordinate system in the direction of travel 11, the coordinate Y describes the coordinate system in the lateral direction and the coordinate Z describes the coordinate system in the vertical direction. The function X(t) therefore describes a function in the X direction on the basis of a time t which is related to the time at which the section 13 was determined. Each point of the detected lane 22 is therefore spatially defined. The coefficients of the lane functions can be mathematically determined by suitable fitting methods, with the result that the individual lane functions are defined by the determined coefficients a1, a2, a3, a0 and b1, b2, b3, b0 and c1, c2, c3, c0 and map the lane boundaries 23, 24 as a function of the time. FIG. 3 shows a schematic illustration of the section 13 having the lane functions.

These coefficients form an item of lane information which is transmitted, together with an item of time information and an item of section information, to the map creation device 3 or the server by the transmitting device 6 of the mobile device 2. Transmission is carried out using a wireless communication connection 32, for example. The practice of describing the lane 22 by the polynomial functions makes it possible to considerably reduce the volume of data to be transmitted, with the result that only small volumes of data have to be transmitted for each section 13, 20.

Furthermore, provision is also made for further objects 28 in the environment 12 to be captured. There are, for example, landmarks 26, 27 in the surrounding area 19 of the lane 22 and in the environment 12. The landmark 26 may be, for example, a tree or road lighting, but the landmark 27 may also be an obstacle in the lane 22. This may be, for example, a further motorized transportation vehicle which marks the end of a traffic jam, or an indication that work is being carried out on this lane 22 and it is necessary to change the lane 22.

Provision is also made for the object 28 to also be able to describe snow or aquaplaning in the lane 22, for example, in which case such a state is identified using common image analysis methods.

Provision may also be made for parking garage information, in particular, information relating to available parking spaces, to be transmitted, for example, to the map creation device 3 by the functions X(t), Y(t) and Z(t) or an item of additional information provided by the image analysis. Provision is made for an item of height information captured by a height sensor 30 (see FIG. 1) of the motorized transportation vehicle 50 to be transmitted, together with the information relating to the sections 13, 20, to the server since a parking garage level or an underground parking garage level belonging to a parking space can be identified in this manner. Sensors for determining the geographical height with respect to normal zero, that is to say sea level, are known from the prior art.

The camera 4 captures image contents, and a suitable object recognition method can be used to determine what object 28 is involved. It is likewise possible to determine a position of the object 28, for example, relative to the camera 4. This is carried out, for example, by comparing the identified objects 28 with objects stored in tables. As a result, a size of the objects 28 is determined and a distance to the motorized transportation vehicle 50 or to the camera 4 can then be inferred. The position of the object 28 is known by determining the angles of the objects 28 relative to the camera 4 in a plurality of sections 13, 20 determined in succession. The position can be defined, for example, a vector or as a coordinate with a corresponding object type. This object information is likewise determined as a function of the time for each section 13, 20 and is transmitted to the map creation device 3 or the server by the transmitting device 6.

The map creation device 3 receives object information and associated object positions, section information, lane information and time information for each of the sections. These are combined by a suitable method such that a digital map 60 having the lane 22 is produced. This is carried out without data from a global positioning system (GPS). Known pattern recognition methods, for example, can be used in this case. With the available information, such a method is able to assign the section information and to join the sections 13, 20 to one another given appropriate correspondence.

The similarity between various sections 13, 20 is determined, for example, by comparing the coefficients of the lane functions. If these correspond, it can be assumed that the same lane 22 is involved. For the purpose of verification, yet further information is compared, for example, the object information relating to the type and position of objects 28 which are situated outside the lane 22.

The digital map 60 of the lane 22 is improved by virtue of the fact that a multiplicity of mobile devices 2, for example, a multiplicity of motorized transportation vehicles 50, each transmit object information and associated object positions, section information, lane information and time information for each of the sections to the map creation device 3 and the map creation device 3 uses this information to create the digital map 60 with a high degree of accuracy, for example, by weighting and averaging or superimposition.

If, for example, an object 28 in a section 13, 20 has changed, the method in the map creation device 3 ensures that a particular number of items of information correspond in a first operation. These may be, for example, the coefficients of the lanes 22. If further parameters also correspond in a comparison, for example, object sizes and object types of the objects 28 (for example, in the case of a tree), it is assumed that this is a section 13, 20 which has already been captured at earlier time and has been stored in the digital map 60.

For example, the object type and the object size of an object 28, for example, a traffic sign 31, situated to the left of the left-hand lane likewise correspond in the sections 13, 20 to the previously created information relating to the sections 13, 20. However, the content of the traffic sign 31 may have changed in the interim (for example, because a speed specification has changed). On account of the fact that a particular number of items of information correspond, that is to say a temporally more current section 13, 20 has been assigned to a position in the digital map, and a small area (content of the traffic sign 31) is new, it would be assumed that the section must be updated and the sections 13, 20 are replaced by the map creation device 3. In this example, the speed specification is therefore updated.

Highly accurate localization in a world coordinate system can be calculated by identifying the static landmarks 26, 27 and averaging the associated object positions. This is used to anchor the sections 13, 20 in the digital map 60.

An image of the environment 12 in a local (digital map 60) and global coordinate system is therefore compiled in the map creation device 3 or in the server and comprises a multiplicity of items of information from sections 13, 20. A multiplicity of captured sequences of images from a plurality of mobile devices can therefore be merged to form a single, highly accurate digital map 60.

The map creation device is able to transmit the compiled image of the environment as a digital map to the mobile devices 2, in particular, to the motorized transportation vehicle 50, again. If a mobile device 2 receives this information by a receiving device 33, the received section of the environment 12 is compared in the evaluation unit 5 with the section 13 which has just been recorded, and the exact position of the mobile device 2 or of the motorized transportation vehicle 50 is determined by evaluating the difference. If this position is certain, the mobile device 2 or the motorized transportation vehicle 50 is provided with further information by the map creation device 3 or the server, for example, traffic jam information and/or conditions of the roadway surfaces. This information is not global, but rather is configured in a lane-accurate manner for the corresponding lane 22 of the motorized transportation vehicle 50. The described method therefore makes it possible to show the driver on a multilane road 18 the lane 22 in which the snow on the roadway surface has already been removed by a winter service, and the lane 22 in which snow is still lying. Furthermore, it is possible to display, for instance, the lane 22 in which a traffic jam is present, and the lane 22 in which the traffic is flowing. In parking garages or underground parking garages, for instance, the available parking spaces on the corresponding level can also be displayed.

It is possible to acquire an accurate image of the environment 12 by the digital maps 60 which are transmitted by the map creation device 3 or the server to the road users.

Furthermore, provision may also be made for the map creation device 3 or the server to be able to determine the viewpoint of the road user by an additionally available item of GPS information and to provide the road user with the image of the environment 12 as the digital map 60.

If a mobile device 2 or a motorized transportation vehicle 50 does not have GPS reception (for example, in a garage), it is possible to determine a position of the mobile device 2 using a last determined position for which sections 13, 20 were transmitted to the map creation device 3 or the server. The map creation device 3 and the server composed the digital map 60 by the sections 13, 20 and are therefore informed of the position of the mobile device 2 or the motorized transportation vehicle 50. If the driver starts the motorized transportation vehicle 50 and the camera 4 on the motorized transportation vehicle 50 captures images, the map creation device 3 or the server transmits information corresponding to the region of the last received image from this camera 4. A method in the motorized transportation vehicle 50 then compares the current image contents with those received from the map creation device 3 or the server and is therefore able to position itself in the digital map 60 provided that image information for sections 13, 20 corresponds. For this purpose, an ego movement estimate based on odometry can be additionally carried out to locate the mobile device 2 or the motorized transportation vehicle 50 in the environment 12 by the digital map 60 without GPS information.

A mobile device 2 may also be, for example, a smartphone, a laptop or a notebook. These may likewise capture, transmit and receive information relating to the environment by the described method, with the result that the receiver is provided with a precise image of its environment. This is beneficial for hikers, cyclists and the like if they have a corresponding mobile device 2 with a camera 4 and require information relating to the environment 12.

In one development, it is also possible for a person to use a mobile device 2 having a camera 4, a transmitting device 6, a receiving device 33 and a suitable method to likewise determine sections 13, 20 and object information, object positions and additional information, with the result that the latter can be used to improve the digital map 60. Therefore, the described method is not only limited to lanes 22 for motorized transportation vehicles 50, but rather can be expanded to all regions which can be captured by a mobile device 2 in an environment 12.

The individual sections 13, 20 are joined in the map creation device 3, for example, by a joining device 8. A plurality of sections 13, 20 of a plurality of mobile devices 2 are averaged in the map creation device 3, for example, by the merging device 9. The digital map 60 is stored in the memory 10 and can be changed there at any time and retrieved again.

Parts of the mobile device 2, of the map creation device 3 and also of the system 1 may be, individually or in combination, a combination of hardware and software, for example, as program code which is executed on a microcontroller or microprocessor.

LIST OF REFERENCE SYMBOLS

1 System
2 Mobile device
3 Map creation device
4 Camera
5 Evaluation unit
6 Transmitting device
7 Receiving device
8 Joining device
9 Merging device
10 Memory
11 Direction of travel
12 Environment
13 Section
14 Front boundary
15 Rear boundary
16 Right-hand boundary
17 Left-hand boundary
18 Road
19 Surrounding area
20 Further section
21 Rear boundary of the further section
22 Lane 23 Right-hand roadway boundary
24 Left-hand lane boundary
25 Center line
26 Landmark
27 Landmark
28 Object
30 Height sensor
31 Traffic sign
32 Communication connection
33 Receiving device
50 Motorized transportation vehicle
60 Digital map

The invention claimed is:

1. A method for creating a digital map, the method being performed under control of a map creation device having a microcontroller, the method comprising:
receiving, by the map creation device from each of a plurality of mobile devices, information associated with (i) one or more objects captured in an image sequence of an environment of the mobile device, the one or more objects each associated with a respective object position relative to the mobile device, (ii) a plurality of defined sections in the environment each having a predetermined size and a predetermined boundary, each object being assigned to a position in at least one of the plurality of defined sections (iii) a traffic lane present in the at least one of the plurality of defined sections, and (iv) a function of time relating to the information associated with the one or more objects, the defined sections, and the traffic lane;
comparing, by the map creation device, each of the plurality of defined sections with one another based on the information associated with the one or more objects, the plurality of defined sections, the traffic lane, and the function of time,
joining, by the map creation device and based on the comparison, the plurality of sections at respectively adjacent boundaries,
merging, by the map creation device, the joined sections of the plurality of mobile devices to form a digital map, the joined sections being merged as a function of a weighting between each of the mobile devices, and
transmitting, from the map creation device, the digital map to each of the plurality of mobile devices.

2. The method of claim 1, wherein the traffic lane is described by a corridor comprising a left-hand lane boundary and a right-hand lane boundary, the left-hand lane boundary and the right-hand lane boundary each being described as lane functions.

3. The method of claim 2, wherein the lane functions are third-degree polynomial functions.

4. The method of claim 1, wherein the defined sections are joined at respectively adjacent boundaries by a similarity comparison, wherein a first defined section of the plurality of defined sections is identified as adjacent to a second defined section of the plurality of defined sections in response to a predetermined value for a similarity between the first and second defined sections being exceeded.

5. The method of claim 1, wherein the weighting is defined, in part, by the information associated with the function of time.

6. The method of claim 1, wherein merging the joined sections comprises averaging a plurality of object positions determined for one of the one or more objects.

7. The method of claim 1, wherein joining the defined sections at respectively adjacent boundaries comprises comparing the traffic lane or one or more lane functions of each of the defined sections with one another.

8. The method of claim 1, further comprising:
receiving additional information for at least one of the plurality of defined sections; and
storing the additional information in the digital map.

9. A system for creating a digital map, the system comprising:
a map creation device;
a plurality of mobile devices, each mobile device associated with a motorized transportation vehicle and having:
at least one camera for capturing an image sequence of an environment of the mobile device, and
a transmitting device for communicating with the map creation device,
wherein the mobile device identifies and classifies objects in the captured image sequence, determines object positions of the objects relative to the mobile device, defines a section in the environment, the section having a predetermined size and predetermined boundaries, assigns identified and classified objects to the determined object positions in the defined section, determines a lane in which the motorized transportation vehicle is present in a section, transmits object information and the object positions of the identified and classified objects, section information relating to the defined section, lane information and time information to the map creation device by the transmitting device, and repeats the preceding operations to define further sections of the environment, and
wherein the map creation device which receives the object information and the object positions, the section information, the lane information, and the time information for each of the sections from the at least one mobile device, compares the individual sections with one another based on the object information and object positions, the section information, the lane information and the time information, joins the sections of the at least one mobile device at their respectively adjacent boundaries, and merges the joined sections of the plurality of mobile devices to form a digital map, the joined sections being merged as a function of a weighting between each of the mobile devices.

10. The system of claim 9, wherein the mobile device describes the lane determined in a section by a corridor comprising a left-hand lane boundary and a right-hand lane boundary, the left-hand lane boundary and the right-hand lane boundary each being described as lane functions.

11. The system of claim 10, wherein the lane functions are third-degree polynomial functions.

12. The system of claim 9, wherein the sections are joined at respectively adjacent boundaries by a similarity comparison.

13. The system of claim 9, wherein the joined sections of each mobile device are merged based on a weighting, wherein the weighting is defined, in part, by the time information.

14. The system of claim 9, wherein the joined sections are merged by comparing lanes of each of the defined sections with one another.

15. A method for creating a digital map, the method being performed under control of a mobile device comprising a microcontroller, the method comprising:
capturing, by the mobile device, an image sequence of an environment;

identifying, by the mobile device, one or more objects in the captured image sequence;

determining, by the mobile device, a classification and position for each of the identified one or more objects;

defining, by the mobile device and in the environment, a section having a predetermined size and a plurality of predetermined boundaries;

assigning, by the mobile device, each of the one or more objects to the determined position relative to the defined section;

determining, by the mobile device, a lane present in the section; and transmitting, by the mobile device, information associated with the one or more objects, the determined classification and position, the lane, and the section to a map creation device; and receiving, by the mobile device and from the map creation device, a digital map formed, in part, from the transmitted information, the digital map including the section merged with a plurality of sections, wherein the section is merged as a function of a weighting between the mobile device and a plurality of other mobile devices.

16. The method of claim 15, wherein the lane is described by a corridor comprising a left-hand lane boundary and a right-hand lane boundary, the left-hand lane boundary and the right-hand lane boundary each being described as lane functions.

17. The method of claim 16, wherein the lane functions are third-degree polynomial functions.

18. The method of claim 15, wherein the weighting is defined, in part, by information associated with a function of time.

19. The method of claim 15, further comprising:
capturing additional information for the section.

20. The method of claim 19, further comprising:
transmitting the additional information to the map creation device.

* * * * *